(12) United States Patent
Hussein

(10) Patent No.: US 6,906,485 B2
(45) Date of Patent: Jun. 14, 2005

(54) SPINDLE MOTOR CONTROL USING A CURRENT PROFILE TO TAPER CURRENT TRANSITIONS

(75) Inventor: Hakam D. Hussein, Eagan, MN (US)

(73) Assignee: Seagate Technology LLC, Scotts Valley, CA (US)

(*) Notice: Subject to any disclaimer, the term of this patent is extended or adjusted under 35 U.S.C. 154(b) by 139 days.

(21) Appl. No.: 10/186,790

(22) Filed: Jun. 28, 2002

(65) Prior Publication Data

US 2003/0102834 A1 Jun. 5, 2003

Related U.S. Application Data

(60) Provisional application No. 60/337,266, filed on Nov. 5, 2001.

(51) Int. Cl.$^7$ .......................... H02R 39/46; H02P 7/50
(52) U.S. Cl. ...................... 318/439; 318/138; 318/254; 318/430; 318/432; 318/434; 360/69; 360/77.02; 360/77.03; 360/77.04; 360/77.05; 360/77.06; 360/77.07; 360/77.08
(58) Field of Search ................................. 318/138, 254, 318/439, 800, 430, 432, 434, 685, 696; 360/73.01–73.03, 69, 77.02–77.08

(56) References Cited

U.S. PATENT DOCUMENTS

| | | | | |
|---|---|---|---|---|
| 4,197,489 A | * | 4/1980 | Dunn et al. | 318/138 |
| 5,012,166 A | * | 4/1991 | Ushijima et al. | 318/254 |
| 5,115,174 A | * | 5/1992 | Masuda et al. | 318/254 |
| 5,397,972 A | * | 3/1995 | Maiocchi | 318/439 |
| 5,446,359 A | | 8/1995 | Horst | |
| 5,457,365 A | * | 10/1995 | Blangaila et al. | 318/430 |
| 5,461,295 A | | 10/1995 | Horst | |
| 5,466,997 A | * | 11/1995 | Utenick et al. | 318/254 |
| 5,589,752 A | | 12/1996 | Iwasaki et al. | |
| 5,767,643 A | * | 6/1998 | Pham et al. | 318/439 |
| 5,796,545 A | * | 8/1998 | Canclini | 360/78.04 |
| 5,808,438 A | * | 9/1998 | Jeffrey | 318/634 |
| 5,821,715 A | * | 10/1998 | Plutowski et al. | 318/472 |
| 5,859,512 A | * | 1/1999 | Buthker | 318/254 |
| 5,936,365 A | * | 8/1999 | Li et al. | 318/439 |
| 5,973,462 A | | 10/1999 | Kalpathi et al. | |
| RE36,568 E | | 2/2000 | Horst | |
| 6,088,185 A | * | 7/2000 | Ratliff et al. | 360/77.03 |
| 6,104,153 A | * | 8/2000 | Codilian et al. | 318/362 |
| 6,198,590 B1 | * | 3/2001 | Codilian et al. | 360/73.03 |
| 6,236,174 B1 | * | 5/2001 | White | 318/254 |
| 6,285,521 B1 | * | 9/2001 | Hussein | 360/73.03 |
| 6,411,057 B2 | | 6/2002 | Gotou | |
| 6,493,169 B1 | * | 12/2002 | Ferris et al. | 360/73.03 |
| 6,498,446 B1 | * | 12/2002 | Menegoli et al. | 318/254 |
| 6,534,936 B2 | * | 3/2003 | Messanger et al. | 318/254 |
| 6,549,361 B1 | * | 4/2003 | Bennett et al. | 360/75 |
| 6,560,056 B1 | * | 5/2003 | Ryan | 360/69 |
| 6,566,832 B2 | * | 5/2003 | Ataee | 318/560 |

* cited by examiner

Primary Examiner—Robert Nappi
Assistant Examiner—Tyrone Smith
(74) Attorney, Agent, or Firm—Fellers, Snider, et al.

(57) ABSTRACT

Method and apparatus for operating a motor. During a commutation state current is applied to a motor while field effect transistors (FETs) are held in an enable or disable state to effect current in phases of the motor. The phases have a high FET and a low FET. Control circuitry is employed to detect back electromotive force and zero crossing (Zc) signals that indicate transition timing for the commutation states. At a transition state the current is decreased in accordance with a noninstaneous decay function and applying a pulse width modulated signal to a switching element. Alternatively, the current is decreased by enabling either all low side FETs or all high side FETs to allow the current to decay. The next commutation state is applied after the current has been reduced, avoiding negative current to be source from ground and reducing current spikes in the motor.

26 Claims, 8 Drawing Sheets

SPINDLE MOTOR CONTROL USING A CURRENT PROFILE TO TAPER CURRENT TRANSITIONS

RELATED APPLICATIONS

This application claims priority to U.S. Provisional Application No. 60/337,266 filed Nov. 5, 2001.

FIELD THE INVENTION

The claimed invention relates generally to the field of disc drive data storage devices and more particularly, but not by way of limitation, to a method and apparatus for operating a disc drive spindle motor.

BACKGROUND

A disc drive is a data storage device used to store digital data. A typical disc drive includes a number of rotatable magnetic recording discs that are axially aligned and mounted to a spindle motor for rotation at a high constant velocity. A corresponding array of read/write heads access tracks defined on the respective disc surfaces to write data to and read data from the discs.

Disc drive spindle motors are typically provided with a three-phase, direct current (dc) brushless motor configuration. The phase windings are arranged about a stationary stator on a number of radially distributed poles. A rotatable spindle motor hub is provided with a number of circumferentially extending permanent magnets in close proximity to the poles. Application of current to the windings induces electromagnetic fields that interact with the magnetic fields of the magnets to apply torque to the spindle motor hub and induce rotation of the discs.

Early disc drive spindle motor designs used Hall effect or similar external sensors to provide an independent indication of motor positional orientation. However, present designs avoid such external sensors and instead use electronic commutation and back electromagnetic force (bemf) detection circuitry to provide closed-loop spindle motor control. Such approach generally entails applying a predetermined sequence of commutation steps to the phase windings of the spindle motor over each electrical revolution (period) of the motor. A commutation step involves supplying the motor with current to one phase, sinking current from another phase, and holding a third phase at a high impedance in an unenergized state.

Detection circuitry measures the bemf generated on the unenergized phase, compares this voltage to the voltage at a center tap of the windings, and outputs a signal at a zero crossing of the voltages; that is, when the bemf voltage changes polarity with respect to the voltage at the center tap. The point at which the zero crossing occurs is then used as a reference for the timing of the next commutation pulse, as well as a reference to indicate the position and relative speed of the motor.

When a commutation state is selected is sense mode, a desired peak motor current is commanded through the DAC input to the power amplifier. The abrupt shut off of the selected switching element can cause negative current to be sourced out of ground through the sense resistor, motor winding, and the power supply.

One source for this transient current flow is from the deactivated phase. For example, if during a selected commutation state current is sourced to phase A and sunk from phase B, abruptly shutting off the driver forces negative current to be sourced out of ground through the sense resistor, through the lower field effect transistor (FET) body diode driving coil A, through the motor, back through the body diode of the upper FET on phase B to the power supply.

Negative current through the sense resistor generates a negative voltage across the sense resistor. Negative voltage that exceeds more than a diode voltage drop can create a parasitic current that overheats and damages the device. Also, sinking current into the power supply can cause an unstable condition in the power supply.

Forcing negative current back into a power supply also forces the supply voltage to increase. The increase in voltage is dependent on the current, capacitance and duration. Since power supplies are designed for minimum capacitance to keep costs down, power supplies are especially vulnerable. Voltage generated by a transient condition can easily exceed the limits in which the voltage supply breaks down.

Accordingly, there is a need for improvements in the art whereby a high performance spindle motor can be reliably controlled up to an operational velocity. It is to such improvements that the present invention is directed.

SUMMARY OF THE INVENTION

In accordance with preferred embodiments, a disc drive includes a spindle motor, back electromagnetic force (bemf) detection circuitry that detects bemf from rotation of the motor, commutation circuitry that electrically commutates the motor in relation to the detected bemf over a range of commutation states, and control circuitry which directs the operation of the motor.

During operation of a motor, current is applied to phase windings of the motor. Each phase has a high and a low switching element and the current is applied by providing control signals to the appropriate switching elements. When the motor current rises and reaches a trip point defined by a digital to analog converter (DAC) and sensed by a sense resistor, the current is turned off for a predetermined time. An inductive sense measurement stops a timer at the trip point, and the motor current is tapered by decreasing the commanded current and pulse width modulating a lower switching element. When the motor current has diminished the lower switching element can be disabled or a new commutation state can be selected.

Alternatively, the stopped timer signals the circuitry to enter a brake mode. During the brake mode the motor phases are shorted together for a predetermined time by enabling either all the high or all the low switching elements. The current will decay through the motor phases until the current diminishes. The next commutation state is then selected.

These and various other features and advantages which characterize preferred embodiments of the present invention will be apparent from a reading of the following detailed description and a review of the associated drawings.

BRIEF DESCRIPTION OF THE DRAWINGS

FIG. 6 is a graphical representation of motor characteristics for a spindle motor operated in accordance with the prior art.

DETAILED DESCRIPTION

Figure 1:
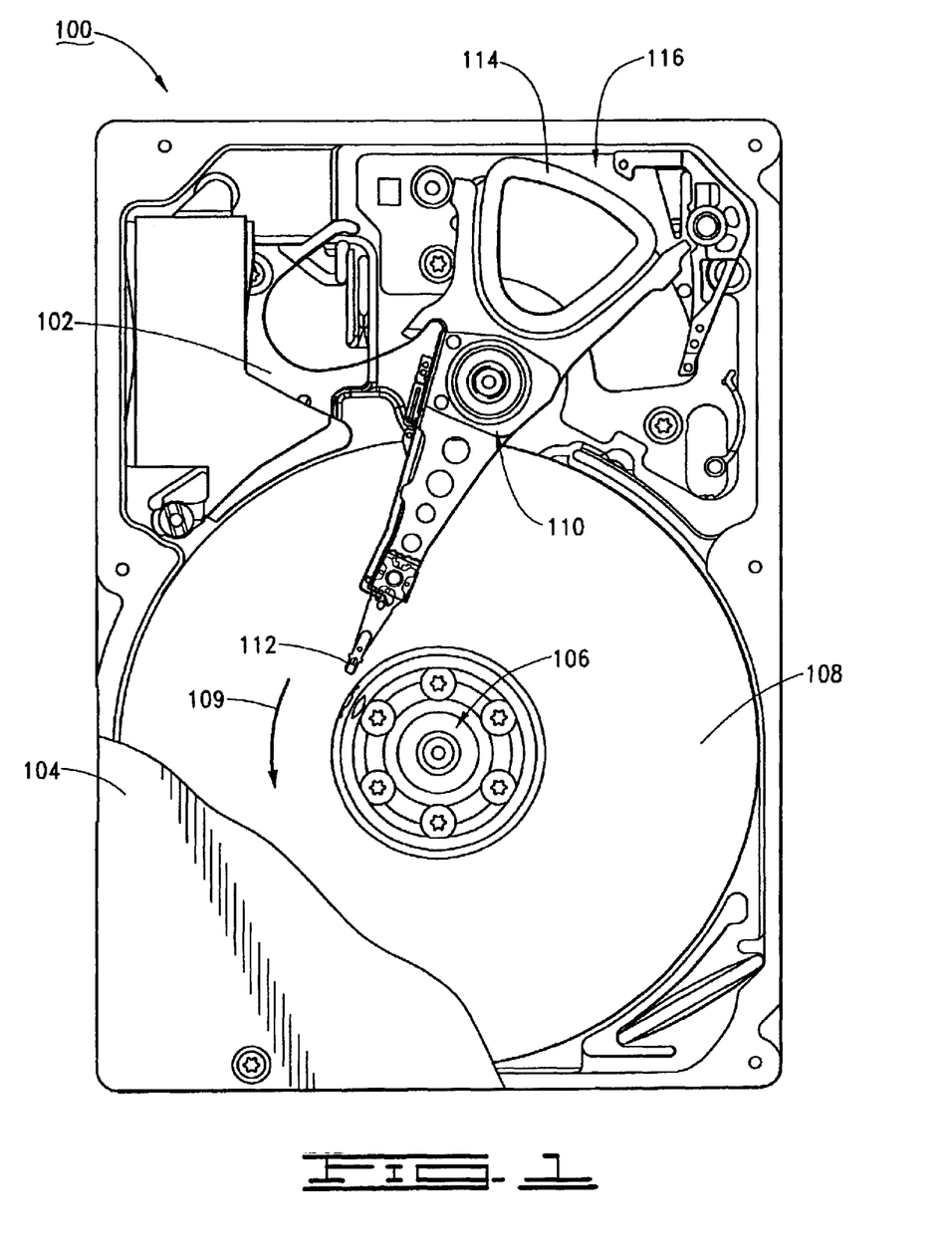
FIG. 1 is a top plan view of a disc drive constructed in accordance with preferred embodiments of the present invention.

FIG. 1 provides a top plan view of a disc drive 100 constructed in accordance with preferred embodiments of the present invention. A base deck 102 and a top cover 104 (shown in partial cutaway) cooperate to form a sealed housing for the disc drive 100. A spindle motor 106 rotates a number of magnetic recording discs 108 in a rotational direction 109. An actuator assembly 110 supports an array of read/write heads 112 adjacent the respective disc surfaces. The actuator assembly 110 is rotated through the application of current to an actuator coil 114 of a voice coil motor (VCM) 116.

Figure 2:
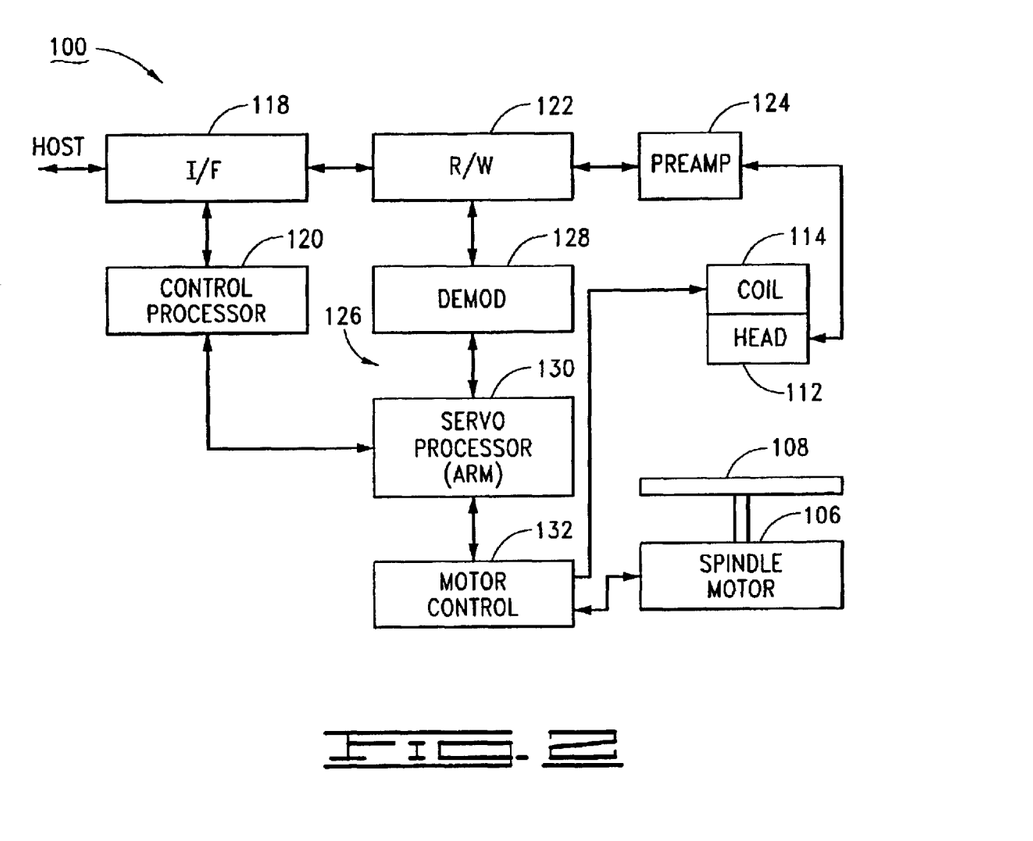
FIG. 2 provides a functional block diagram of the disc drive of FIG. 1.

FIG. 2 provides a functional block diagram of the disc drive 100. FIG. 2 includes control circuitry provided on a disc drive printed circuit board (PCB) affixed to the underside of the disc drive 100, and thus not visible in FIG. 1.

Data and host commands are provided from a host device to the disc drive 100 using interface (I/F) circuitry 118 in conjunction with a top level control processor 120. Data are transferred between the discs 108 and the host device using the I/F circuitry 118, a read/write (R/W) channel 122, and a preamplifier/driver (preamp) circuit 124.

Head positional control is provided by a closed-loop servo circuit 126 comprising demodulation (demod) circuitry 128, a servo processor 130. The servo processor preferably comprises an ARM (advanced RISC (reduced instruction set computer) machine) and motor control circuitry 132. The motor control circuitry 132 applies drive currents to the actuator coil 114 to rotate the actuator 110. The motor control circuitry 132 further applies drive signals to the spindle motor 106 to rotate the discs 108.

Figure 3:
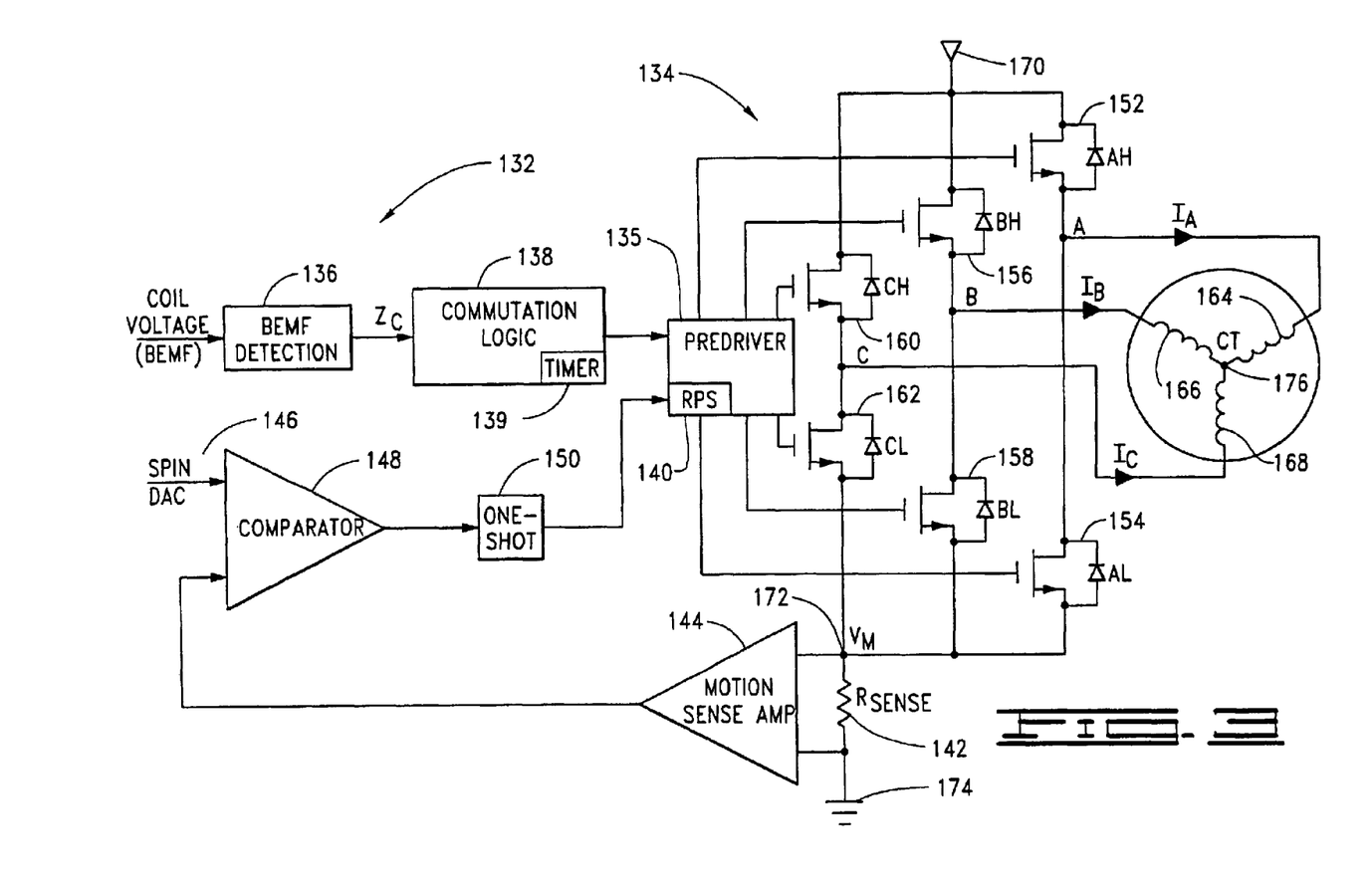
FIG. 3 provides a schematic representation of rotor position sense (RPS) circuitry and motor control circuitry of FIG. 2.

FIG. 3 provides a functional block diagram of relevant portions of the motor control circuitry 132 of FIG. 2 and the spindle motor 106 of FIG. 1. Spindle driver circuitry 134 applies drive currents to the phases of the spindle motor 106 over a number of sequential commutation steps to rotate the motor. Generally, during each commutation step current is applied to one phase, sunk from another phase, and a third phase is held at a high impedance in an unenergized state.

Back electromagnetic force (bemf) detection circuitry 136 measures the bemf generated on the unenergized phase, compares this voltage to the voltage at a center tap, and outputs a zero crossing (Zc) signal when the bemf voltage changes polarity with respect to the voltage at the center tap. A commutation circuit 138 uses the Zc signals to time the application of the next commutation step using a timer 139 (preferably disposed in the control logic block 138).

The spindle driver circuitry 134 includes predriver 135 and rotor position sense (RPS) circuitry 140 to detect electrical position of the spindle motor 106 in a manner to be discussed shortly. At this point it will be noted that the spindle driver circuit 134 includes a sense resistor RS 142, a motion sense amplifier 144, a digital to analog converter (DAC) 146, a comparator 148 and a one shot element 150. FIG. 3 also shows the spindle driver circuitry 134 to include six field effect transistors (FETs) 152, 154, 156, 158, 160 and 162, with inputs denoted as AH (A high), AL (A low), BH, BL, CH and CL, respectively. Controlled, timed application of drive currents to the various FETs result in flow of current through A, B and C phase windings 164, 166 and 168 from a voltage source 170 to $V_M$ node 172, through the RS sense resistor 142 to reference node (ground) 174. Spindle motor commutation steps (states) are defined in Table 1:

TABLE 1

| Commutation State | Source Phase | Sink Phase | Phase Held at High Impedance |
|---|---|---|---|
| 1 | A | B | C |
| 2 | A | C | B |
| 3 | B | C | A |
| 4 | B | A | C |
| 5 | C | A | B |
| 6 | C | B | A |

During commutation step 1, phase A (winding 164) is supplied with current, phase B (winding 166) outputs (sinks) current, and phase C (winding 168) is held at high impedance. This is accomplished by selectively turning on AH FET 152 and BL FET 158, and turning off AL FET 154, BH FET 156, CH FET 160 and CL FET 162. In this way, current flows from source 170, through AH FET 152, through A phase winding 164, through the center tap (CT node 176), through B phase winding 166, through BL FET 158 to $V_M$ node 172, and through RS sense resistor 142 to ground 174. The resulting current flow through the A and B phase windings 164, 166 induce electromagnetic fields which interact with a corresponding array of permanent magnets (not shown) mounted to the rotor (spindle motor hub), thus inducing a torque upon the spindle motor hub in the desired rotational direction. The appropriate FETs are sequentially selected to achieve the remaining commutation states shown in Table 1.

It will be noted that each cycle through the six commutation states of Table 1 comprises one electrical revolution of the motor. The number of electrical revolutions in a physical, mechanical revolution of the spindle motor is determined by the number of poles. With 3 phases, a 12 pole motor will have four electrical revolutions for each mechanical revolution of the spindle motor.

The frequency at which the spindle motor 106 is commutated, referred to as the commutation frequency FCOM, is determined as follows:

$$FCOM = (\text{phases})(\text{poles})(RPM)/60 \quad (1)$$

A three-phase, 12 pole spindle motor operated at 15,000 revolutions per minute would produce a commutation frequency of:

$$FCOM = (3)(12)(15,000)/60 = 9,000 \quad (2)$$

or 9 kHz. The commutation circuit 138 will thus commutate the spindle driver circuitry 134 at nominally this frequency to maintain the spindle motor 106 at the desired operational velocity of 15,000 revolutions per minute (rpm). The foregoing relations can be used to determine the actual motor speed (and therefore speed error) in relation to the frequency at which the zero crossing Zc pulses are provided from the bemf detection circuitry 136.

Figure 4:
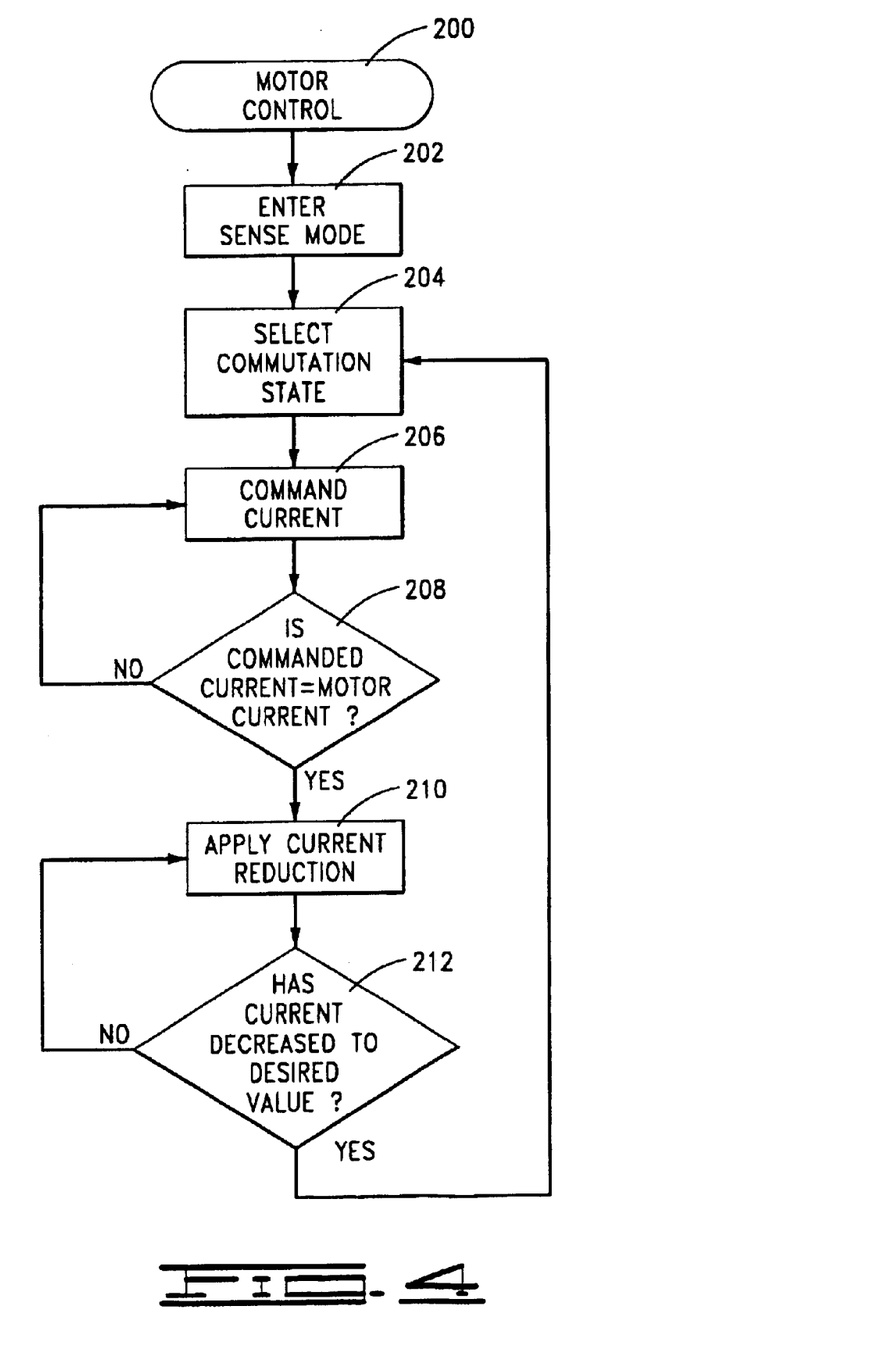
FIG. 4 is a flow chart for a MOTOR CONTROL routine illustrative of steps carried out in accordance with preferred embodiments of the present invention to accelerate the spindle motor.

Having concluded a review of relevant circuitry of the disc drive 100, reference is flow made to FIG. 4 which provides a flow chart for a MOTOR CONTROL routine 200 illustrative of steps carried out by the disc drive 100 in accordance with preferred embodiments of the present invention to operate the spindle motor 106.

The routine initially proceeds to step 202 to enter a sense mode. The sense mode is generally characterized by the motor turning at sufficient speeds such that the bemf at the motor can be detected. Similarly, commutation circuitry is able to function at a Zc detected by the bemf circuitry.

Several methods are known in the art to begin acceleration such that bemf detection is possible. One approach is to determine the electrical rotational position of the spindle motor 106. Spindle driver circuitry 134 applies sense pulses to all six commutation states and uses the RPS circuitry 140 to measure the associated rise time of the voltages at $V_M$ node 172. The sense pulses provide sufficient amplitude and duration to enable detection of the electrical position of the motor 106.

When the electrical position is detected, drive pulses are applied to the motor to initiate rotation. To implement closed loop control of the motor the motor velocity typically must be increased to a point where sufficient bemf is generated to allow control of the motor.

At step 204 a commutation step is applied to the motor. Using the commutation state 1 discussed above by way of example, current is applied by the controlled activation of AH and BL FETs 152, 158 (FIG. 3) by the spindle driver circuitry 134.

At step 206, a digital threshold value is input to the DAC 146 (FIG. 3) for a commanded drive current; that is, the input value indicates a desired magnitude of current to be applied to the motor. The timer 139 is initiated at this time (time $t_0$). The resulting voltage at $V_M$ node 172 will rise in relation to the impedance of the spindle motor 106, and the impedance of the spindle motor 106 will vary depending upon the electrical position of the motor.

The comparator 148 is configured to receive the $V_M$ voltage and the (analog equivalent) threshold value from the DAC 146. The comparator 148 monitors the respective inputs from the DAC 146 and the $V_M$ voltage from the motion sense amplifier 144. If the $V_M$ voltage does not reach the threshold level then the motor current has not yet reached the commanded current. The motor current is monitored at decision step 208 to check whether the commanded current equals the motor current. If the motor current has not yet reached the commanded current, the routine returns to step 206 to continue applying the current in accordance with the commanded current.

When the motor current reaches the commanded current ($V_M$ voltage eventually reaches the threshold level), the control logic 138 stops the timer (time $t_1$). The routine then proceeds to step 210 to reduce the current in the motor 106 in accordance with preferred embodiments of the present invention.

In a preferred embodiment, the FETs are maintained for the present commutation state, and the current to the windings is tapered. The current is tapered by reducing the commanded drive current at the DAC 146 and applying a pulse width modulated signal to the low side FET of the active phase.

Figure 5:
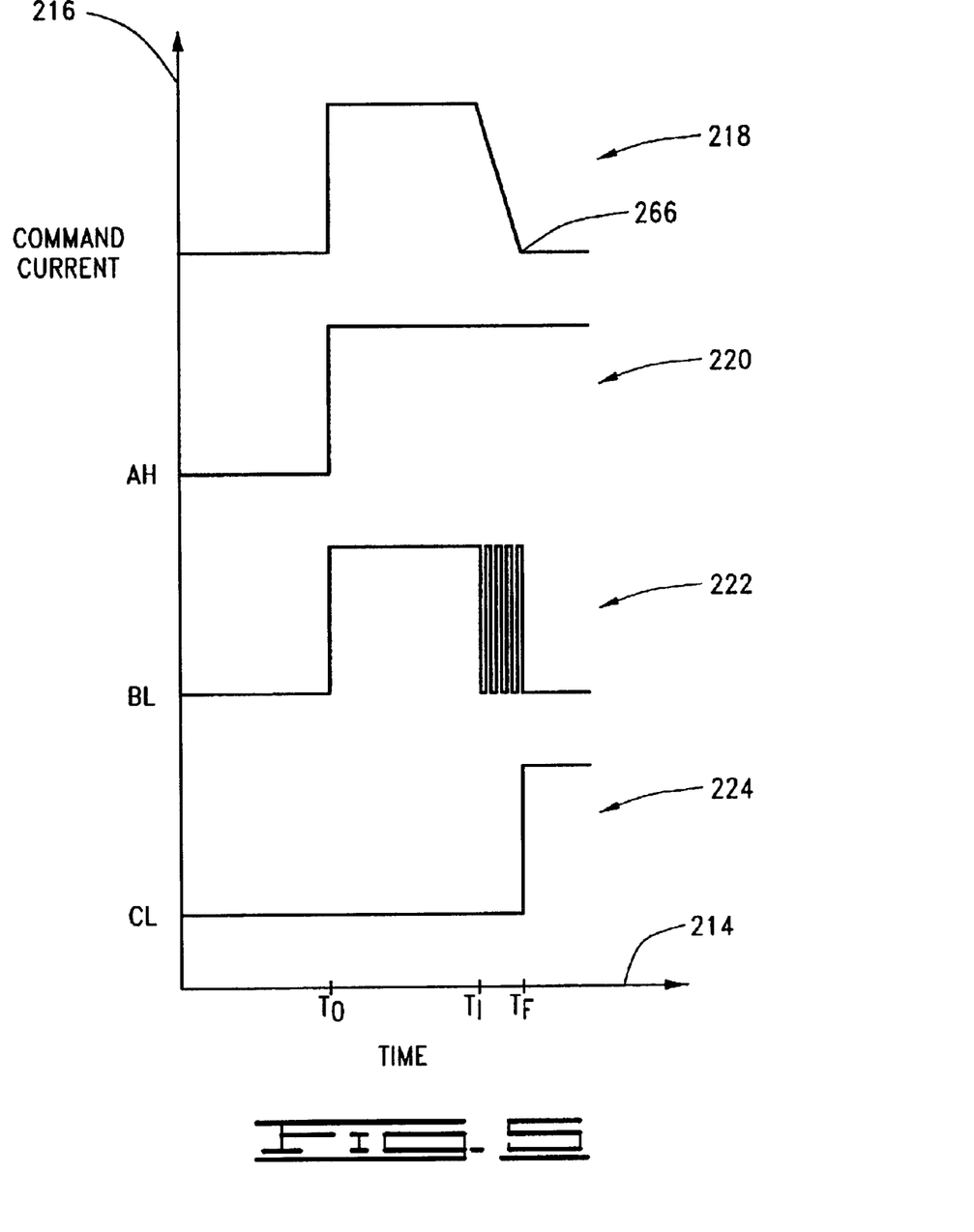
FIG. 5 is a graphical representation of commanded current and switching element enable signals using the RPS circuitry and motor control circuitry of FIG. 3 during the steps of the flow chart of FIG. 4.

The current tapering methodology is shown in the graphical representation of FIG. 5. Time is plotted on the x-axis 214 and magnitudes of current and FET enable signals are shown on y-axis 216. Although FIG. 5 demonstrates the drive signals for commutation state 1 (from Table 1), embodiments of the routine of FIG. 4 are applicable to all commutation states. As can be seen in the drive current curve 218 and FET enable curves 220, 222, 224 the stopped timer (at time $t_1$) causes the drive current to begin tapering. The low enabled FET has a PWM signal applied at time $t_1$, but the other the FET states remain constant until time $t_F$, which coincides with the drive current value decreasing to a zero value as shown at 226. Although a final preferred value for the drive current is zero, a negligible value is acceptable if the magnitude is such that a negative current is not generated at sense resistor 142.

The current tapering can be implemented in a linear or exponential decay manner. Other implementations of the current decay are useful if the methods result in a negligible current at time $t_F$. The speed of the decay can be varied, but must not be so long as to interfere with the next commutation state. A decay rate of 1A/20 $\mu$sec has been shown to be effective, but this can vary depending on the motor configuration and operating conditions.

In another preferred embodiment to reduce the current at step 210, the system enters a brake mode. The brake mode is triggered at time $t_1$ as the timer is stopped. The motor phases are shorted together through the FETs for a predetermined time period to decay the current. The phases are shorted by enabling either all upper FETs or all lower FETs, thus allowing the current to dissipate in the phases. The predetermined time period is programmable into control circuitry 134 and allows sufficient time for the current to decay.

Returning to the routine of FIG. 4, decision step 212 determines whether the reduced current has reached an acceptable level such that the FET driver can be switched to the next commutation state. If the current has not yet decayed to an acceptable level the routine returns to step 210 to continue the current reduction. If the current has decayed to an acceptable level such as zero (as shown at time $t_F$ in FIG. 5) the routine returns to step 204 to apply the next commutation step.

It will flow be appreciated that the routine of FIG. 5 provides several advantages over the prior art. One advantage is that the voltage across the sense resistor does not become negative. The abrupt disable of the FET does not occur such that current is forced out of ground, into the motor and power supply. This decreases overheating problems that result from the negative current.

Another advantage is the ability to provide greater stability to the power supply. Many power supplies become unstable when current is sunk into them. This instability forces motor restarts that degrade the dependability of the system.

Another advantage is the avoidance of catastrophic breakdowns of the motor. Since a negative current causes a voltage increase in the supply, and since motors are designed for minimum capacitance, a relatively short duration increase in the current can result in a transient current beyond safe operating limits. The corresponding rise in voltage can cause the device to break down. Elimination of the negative current helps prevent this condition.

Figure 7:
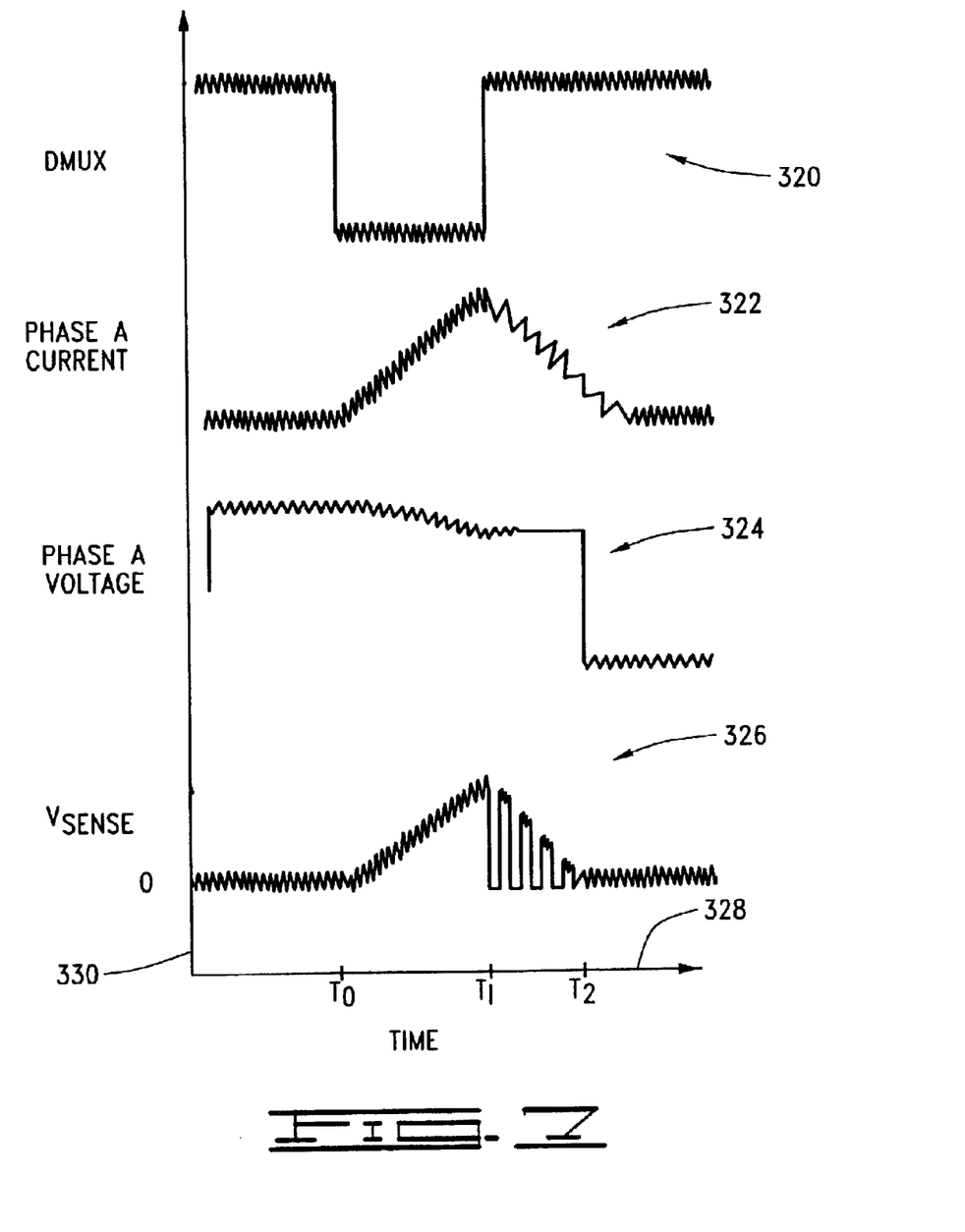
FIG. 7 is a graphical representation of motor characteristics for the spindle motor operated in accordance with a preferred embodiment of the routine of FIG. 4.
Figure 8:
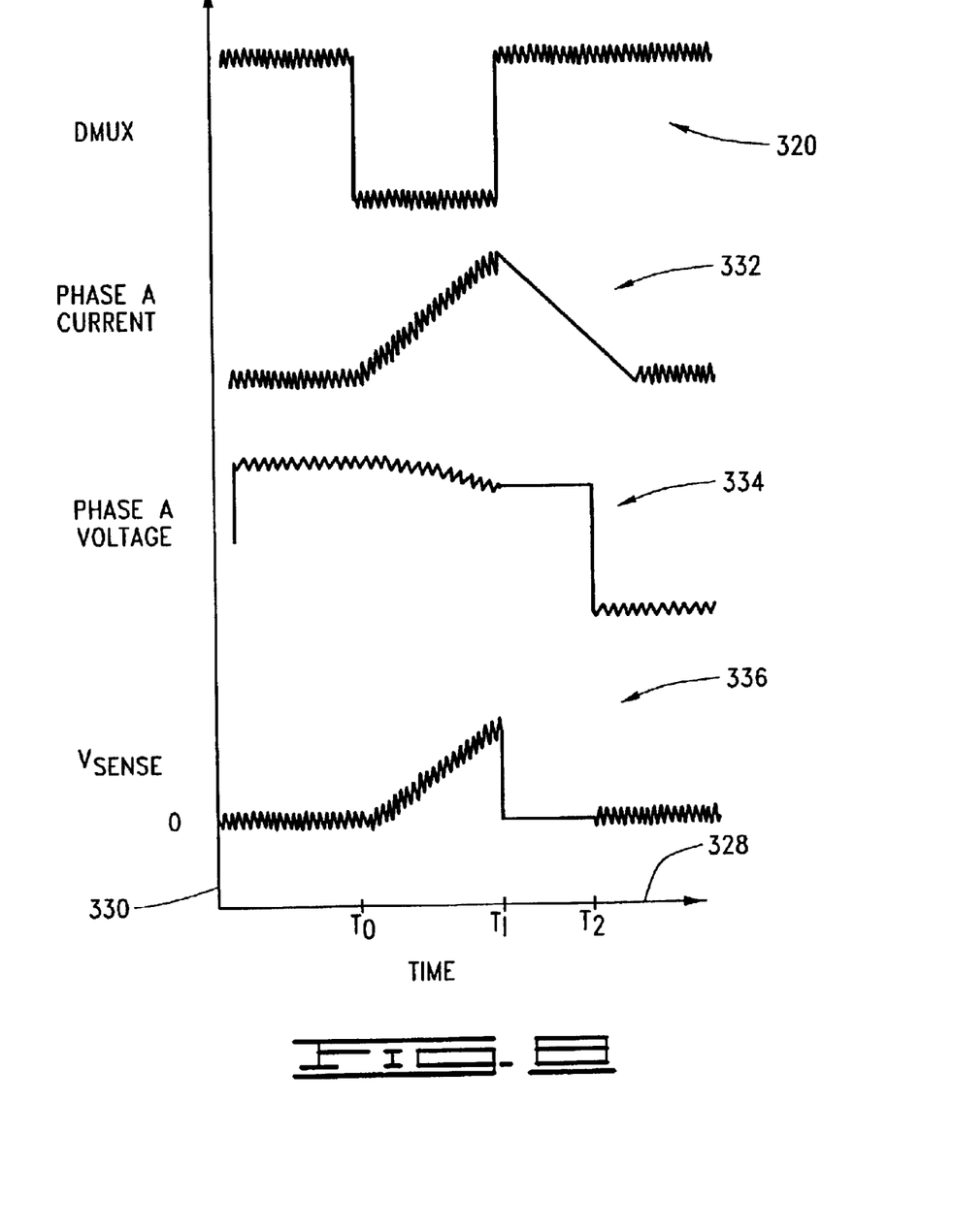
FIG. 8 is a graphical representation of motor characteristics for the spindle motor operated in accordance with another preferred embodiment of the routine of FIG. 4.

FIGS. 6, 7 and 8 generally compare and contrast motor operation without and with use of the routine of FIG. 4. FIG. 6 is a graphical representation of a DMUX curve 300, a phase A current curve 302, a phase A voltage curve 304 and a VSENSE voltage curve 306 (indicative of the voltage across the sense resistor 142). These curves are plotted against a common elapsed time x-axis 308 and a common amplitude y-axis 310.

The DMUX curve 300 represents an inductance measurement which begins at each new commutation state (the watchdog timer 139 runs during this time to measure the pulse width of the DMUX line; the width of the pulse indicates the inductance of the motor 106).

At time $T_0$, the current sourced to phase A steadily increases from about zero volts to a maximum at time $T_1$, as shown by curve 302. The phase A voltage (curve 304) shows a sudden drop to substantially zero volts at time $T_1$ indicating that the driver deactivated the associated FETs once the maximum current was reached. This undesirably causes a substantially large voltage swing on the VSENSE voltage (curve 306), causing negative current to flow from ground 174 and through the sense resistor 142.

By contrast, FIG. 7 provides a DMUX curve 320, a phase A current curve 322, a phase A voltage curve 324 and a VSENSE curve 326 plotted against an elapsed time x-axis 328 and a common amplitude y-axis 330. As before, the inductance of the motor 106 is measured during the interval from $t_0$ to $t_1$ and the phase A current reaches a maximum at time $t_1$. However, the driver maintains the upper FET 152 for phase A in an active state while the current is tapered (curve 322) and applies a PWM signal to lower FET 158, keeping the voltage VSENSE positive (curve 326).

Also in contrast to FIG. 6, FIG. 8 provides a DMUX curve 320, a phase A current curve 332, a phase A voltage curve 334 and a VSENSE curve 336 plotted against the same elapsed time x-axis 328 and common amplitude y-axis 330 as shown in FIG. 7. As before, the inductance of the motor 106 is measured during the interval from to $t_0$ $t_1$ and the phase A current reaches a maximum at time $t_1$. However, the driver maintains the upper FETs 152, 156, 158 (or lower FETs 154, 158, 162) in an active state while the current decays (curve 332), keeping the voltage VSENSE positive (curve 336).

Accordingly, it will now be understood that the present invention, as embodied herein and as claimed below, is directed to a method and apparatus for controlling operation of a spindle motor. In accordance with preferred embodiments, a disc drive (such as 100) includes a spindle motor (such as 106), back electromagnetic farce (bemf) detection circuitry (such as 136) that detects bemf from rotation of the spindle motor, commutation circuitry (such as 138) that electrically commutates the spindle motor in relation to the detected bemf over a range of electrical rotational positions, and control circuitry (such as 130, 132, 134) that controls the operation of the spindle motor by commanding drive current values.

During operation, the spindle motor is initially accelerated by applying drive pulses to the spindle motor (such as by step 202) and detecting successive spindle motor commutation state transitions as the spindle motor rotates through a range of commutation states (such as by step 204).

A commutation step involves supplying the motor with current to one phase, sinking current from another phase, and holding a third phase at a high impedance in an unenergized state. Detection circuitry measures the bemf generated on the unenergized phase, compares this voltage to the voltage at a center tap of the windings, and outputs a signal at a zero crossing of the voltages; that is, when the bemf voltage changes polarity with respect to the voltage at the center tap. The point at which the zero crossing occurs is then used as a reference for the timing of the next commutation pulse, as well as a reference to indicate the position and relative speed of the motor.

The timer is stopped when transition to another commutation state is acceptable. The motor current is then reduced to a minimal value (such as step 210) while the condition of the phases is held constant by decreasing the commanded current to the DAC 146 and applying a PWM signal to the low side FET. Once the current reaches a minimal value the phases are reapplied consistent with the next commutation state (such as step 204).

Alternatively, either all the high side FETs or all the low side FETs are enable to allow the current to decay in the motor due to shorting the phases.

For purposes of the appended claims, the function of the recited "means" element will be understood as carried out by the disclosed structure including the servo processor 130 and the motor control 132 (FIG. 2) programmed in accordance with the routine of FIG. 4.

It is to be understood that even though numerous characteristics and advantages of various embodiments of the present invention have been set forth in the foregoing description, together with details of the structure and function thereof, this detailed description is illustrative only, and changes may be made in detail, especially in matters of structure and arrangement of parts within the principles of the invention to the full extent indicated by the broad general meaning of the terms in which the appended claims are expressed. For example, the particular elements may vary depending on the particular application for the motor start routine while maintaining the same functionality without departing from the spirit and scope of the invention.

In addition, although the embodiments described herein are generally directed to a motor control routine for a disc drive, it will be appreciated by those skilled in the art that the routine can be used for other devices to operate a rotatable member without departing from the spirit and scope of the claimed invention.

What is claimed is:

1. A method for commutating a multiphase spindle motor having a plurality of phases, each phase having a high and a low switching element, the high switching elements each connected in series with a voltage source and the low switching elements each connected in series with a sense resistor, the method comprising:

detecting a selected commutation state of the spindle motor;

initiating a timer to measure a selected elapsed time;

applying a desired magnitude of current to the spindle motor during the elapsed time by sourcing current to a first selected phase and sinking current from a second selected phase associated with the selected commutation state, wherein the desired magnitude of current is maintained by providing a commanded current value indicative of the desired current magnitude and applying control signals to the switching elements associated with the first and second selected phases in response to a voltage detected across the sense resistor;

deactivating the switching elements associated with the first and second selected phases at the conclusion of the elapsed time so that substantially zero current flows through the spindle motor tapering the current from the desired magnitude to substantially zero current along a noninstantaneous gradient at the conclusion of the elapsed time by providing a sequence of current command values of successively decreased magnitude in accordance with a desired tapered current profile; and repeating the detecting, initiating, applying and deactivating steps for the next detected commutation state.

2. The method of claim 1, wherein the deactivating step further comprises applying a pulse width modulated signal to the switching element at the second selected phase.

3. The method of claim 1, wherein the current profile defines a substantially linear decrease in the current from the desired current magnitude to substantially zero current.

4. The method of claim 1, wherein the current profile defines a substantially exponential decrease in the current from the desired current magnitude to substantially zero current.

5. The method of claim 1, wherein the detecting step comprises detecting back electromotive force (bemf) from the spindle motor and detecting the selected commutation state in relation to the detected bemf.

6. The method of claim 1, wherein the switching elements each comprise a field effect transistor (FET) having a source, a drain and a gate, and wherein the control signals are provided to the gates of the FETs to control source-drain conductivity.

7. The method of claim 1, further comprising detecting an actual velocity of the spindle motor and wherein the desired current magnitude of the applying step is determined in relation to a velocity error determined in relation to the actual velocity of the spindle motor and a desired velocity of the spindle motor.

8. The method of claim 1, wherein the deactivating step comprises enabling the switching elements in multiple phases to allow the current to decay to substantially zero along a noninstantaneous gradient.

9. A disc drive, comprising:
a multiphase motor configured to rotate at least one recording disc;
high and a low switching elements associated with each phase, the high elements each connected in series with a voltage source and the low switching elements each connected in series with a sense resistor;
a timer that measures a selected elapsed time;
a control circuit that applies a desired magnitude of current to the motor during the elapsed time by sourcing current to a first selected phase and sinking current from a second selected phase, wherein the desired magnitude of current is maintained by providing a commanded current value indicative of the desired current magnitude and applying control signals to the switching elements associated with the first and second selected phases in response to a voltage detected across the sense resistor, wherein the current is tapered along a noninstantaneous gradient to substantially zero after the elapsed time and the control signals are applied after the current is tapered to substantially zero.

10. The disc drive of claim 9, wherein the control circuit further applies a pulse width modulated signal to the switching element in the second selected phase.

11. The disc drive of claim 9, further comprising back electromagnetic force (bemf) detection circuitry coupled to the motor and which detects bemf from rotation of the motor.

12. The disc drive of claim 11, further comprising commutation circuitry coupled to the bemf detection circuitry and motor which electrically commutates the motor in relation to the detected bemf over a range of commutation states of the motor.

13. The disc drive of claim 9, wherein the current is tapered according to a linear function from the commanded current value to substantially zero.

14. The disc drive of claim 9, wherein the current is tapered according to an exponential function from the commanded current value to substantially zero.

15. The disc drive of claim 11, wherein the switching elements each comprise a field effect transistor (FET) having a source, a drain and a gate, and wherein the control signals are provided to the gates of the FETs to control source-drain conductivity.

16. The disc drive of claim 9, further comprising detection circuitry to detect an actual velocity of the spindle motor and wherein the commanded current magnitude is determined in relation to a velocity error determined in relation to the actual velocity of the spindle motor and a desired velocity of the spindle motor.

17. The disc drive of claim 9, wherein the current is tapered by enabling the switching elements in multiple phases to allow the current to decay to substantially zero along a noninstantaneous gradient.

18. An apparatus, comprising:
a motor; and
means for applying current to a selected phase of the motor which increases to a peak magnitude and then tapers along a noninstantaneous gradient to substantially zero current in accordance with a desired tapered current profile.

19. The apparatus of claim 18, wherein the means for applying comprises:
applying a current to the motor;
measuring the current at a sense resistor;
decreasing the current during a transition state in response to a timer;
applying a pulse width modulated signal to a switching element; and
activating switching elements in a winding of the motor after the current has decreased,
wherein the winding has a high and a low switching element.

20. The apparatus of claim 18, wherein the means for applying comprises:
applying a current to the motor;
measuring the current at a sense resistor;
enabling multiple switching elements to allow the motor current to decay during a transition state in response to a timer for a predetermined period of time; and
activating switching elements in a winding of the motor after the current has decreased, wherein the winding has a high and a low switching element.

21. An apparatus for controlling a motor, comprising a control circuit that applies current to a selected phase of the motor which increases to a peak magnitude and then tapers along a noninstantaneous gradient to substantially zero current in accordance with a desired tapered current profile.

22. The apparatus of claim 21, wherein the control circuit provides a first current command value to achieve the peak magnitude and then provides at least one reduced current command value to taper said current along the noninstantaneous gradient.

23. The apparatus of claim 21, wherein the motor comprises a plurality of phases, wherein the control circuit provides a first current command value to achieve the peak magnitude, and then electrically shorts said plurality of phases together to taper said current along the noninstantaneous gradient.

24. The apparatus of claim 21, wherein the control circuit comprises a timer which measures a selected elapsed time and wherein the control circuit initiates the tapering of the current along the noninstantaneous gradient upon conclusion of the selected elapsed time.

25. The apparatus of claim 21, wherein the selected phase of the motor to which the current is applied is characterized as a first phase, wherein the current is sunk from a second phase of the motor, and wherein the control circuit comprises a sense resistor through which the sunk current is conducted in a first direction to a reference line.

26. The apparatus of claim 25, wherein the instantaneous gradient is selected to prevent a subsequent flow of current through the sense resistor in an opposite, second direction from the reference line to the motor.

* * * * *